A. A. MacDONELL.
SCREEN FOR WIND SHIELDS.
APPLICATION FILED MAR. 31, 1919.
1,333,028.
Patented Mar. 9, 1920.
2 SHEETS—SHEET 1.
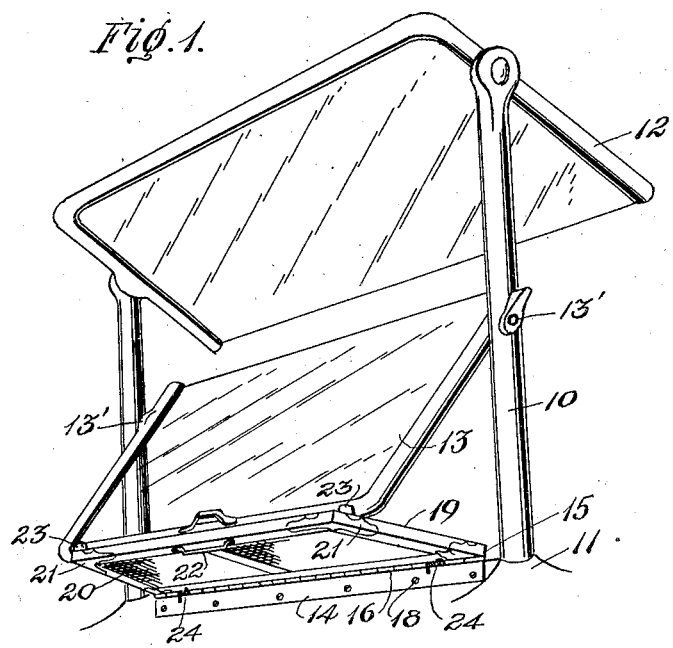
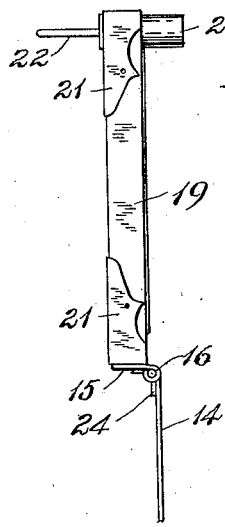
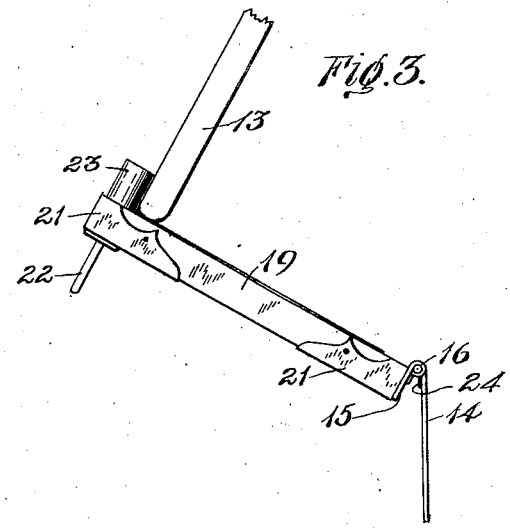
Inventor
A. A. MacDonell,
By Albert Popkins
Attorney

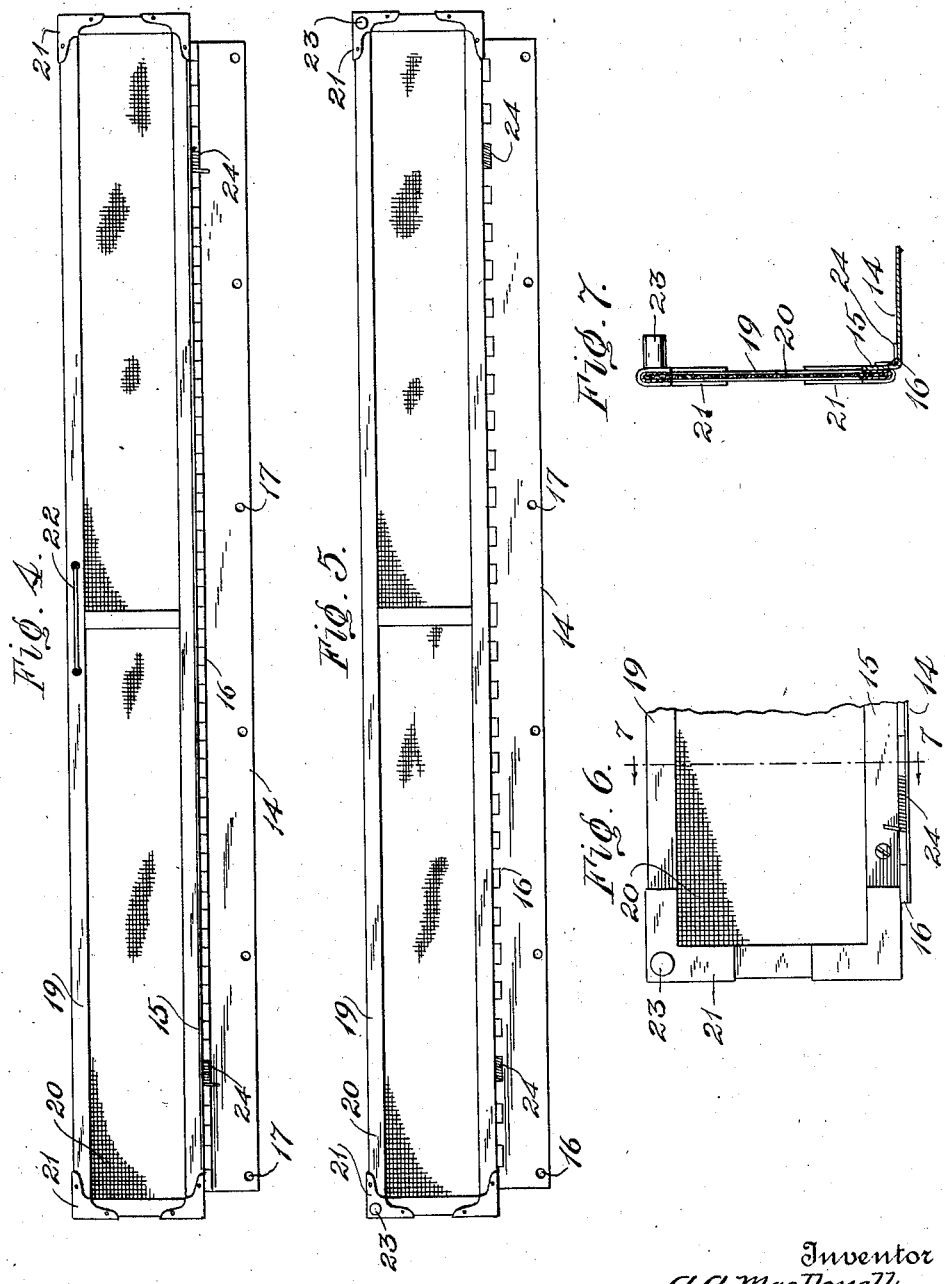

UNITED STATES PATENT OFFICE.

ARTHUR A. MacDONELL, OF LOUISVILLE, KENTUCKY.

SCREEN FOR WIND-SHIELDS.

1,333,028.    Specification of Letters Patent.    Patented Mar. 9, 1920.

Application filed March 31, 1919. Serial No. 286,229.

*To all whom it may concern:*

Be it known that I, ARTHUR A. MAC-DONELL, a citizen of the United States of America, residing at Louisville, in the county of Jefferson and State of Kentucky, have invented certain new and useful Improvements in Screens for Wind-Shields, of which the following is a specification.

This invention relates to windshields, such as are used on automobiles and has special reference to an attachment for that class of windshields which are arranged so that the lower portion of the shield swings rearwardly to ventilate the front part of the car body.

In shields of this description when used for this ventilating purpose, it is well known that the downwardly deflected air strikes violently against the knees of the occupants of the front seat and produces too great a cooling effect. Also, especially when traveling at night insects strike against the inclined shield and are thrown down into the front part of the car to the inconvenience of the occupants.

The principal object of the present invention is to provide a guard for the opening between the lower edge of the shield member and the front of the automobile body, which guard shall be so arranged as to prevent insects from being deflected downwardly into the body of the machine and which will also check the violence of the air draft.

With the above and other objects in view as will be hereinafter apparent the invention consists in general of certain novel details of construction and combinations of parts hereinafter fully described, illustrated in the accompanying drawings and specifically claimed.

In the accompanying drawings, like characters of reference indicate like parts in the several views, and Figure 1 is a perspective view of a windshield in position on an automobile and showing the invention as applied.

Fig. 2 is an end view of a form of the device having a wooden frame, the view showing the invention in the erect or closed position.

Fig. 3 is a view similar to Fig. 2, but showing the invention in the open position.

Fig. 4 is a rear elevation of the attachment.

Fig. 5 is a front elevation thereof.

Fig. 6 is a device showing one end of a modified form wherein a metallic frame is employed.

Fig. 7 is a section on the lines 7—7 of Fig. 6.

In Fig. 1 it will be noted that there is shown a windshield frame or supports 10, which are carried on a car, a small portion of which is indicated at 11. Pivoted to the frame members 10 are upper and lower glazed shield members 12 and 13, respectively. The lower shield member 13 is supported near its upper edge by horizontally alined pivots 13', so that its lower edge may swing rearwardly, as shown in Fig. 1. This is the usual construction of ventilating windshields. The attachment itself consists of a pair of plates 14 and 15, the two being united by a hinge 16, which is preferably of the type known as a piano case or cabinet hinge. The member 14 is provided with suitable screw receiving openings 17 for screws by which it may be attached in any desired position to an automobile such screws being indicated at 18 in Fig. 1. To the member 15 is suitably secured a sash frame 19, the frame being filled with a screen 20 which may be of finely woven wire or other material suitable to keep out insects and to allow a gradual flow of air without permitting a heavy draft. Corner braces 21 add to the strength of the sash frame and adjacent its upper edge centrally of the rear face is provided a handle 22. At the upper corners on the front face are stops 23 which preferably are constructed of some more or less resilient materials such as rubber or the like. These stops serve two purposes. In the first place they limit the rearward motion of the shield member 13, as can be seen in Figs. 1 and 3, and in the second place when the ventilating shield is closed these stops engage against this shield and by their resiliency prevent injury to the shield and rattling of the parts. In order to hold the frame 19 against the shield member 13 certain springs 24 are provided which in this instance are shown as a form of coiled hinge spring and it will be seen by reference to Fig. 1 that these springs hold the free edge of the sash frame 19 against the shield member 13 when the latter is opened and in consequence will also hold the frame 19 in its upright position as shown in Fig. 2 when the shield member is closed.

The operation of the device will be readily understood by reference to Fig. 1 as it can be seen that in order to utilize the screening function of the attachment it is merely necessary to pull the free edge of the frame 19 rearwardly and downwardly, and then pull the free edge of the shield member 13 rearwardly until it engages the stops 23, whereupon the parts can be released and will remain set in the position shown. There has thus been made a simple and efficient device of the kind described and for the purpose specified.

It is obvious that many minor changes may be made in the form and construction of the invention without departing from the material principles thereof.

It is not therefore desired to confine the invention to the exact form herein shown and described, but it is wished to include all such as properly come within the scope claimed.

Having thus described the invention what is claimed as new is:

1. In combination, a wind shield having a member pivoted on a horizontal axis to provide swinging movement of its lower edge, a sash hingedly supported beneath said lower edge and having its free upper edge swinging therewith whereby to fill the bottom opening formed by swinging the shield member and means to hold said shield member and sash frame normally in constant engagement.

2. In combination, a wind shield having a member pivoted on a horizontal axis to provide swinging movement of its lower edge, a sash hingedly supported beneath said lower edge and having its free upper edge swinging therewith whereby to fill the bottom opening formed by swinging the shield member, means to hold said shield member and sash frame normally in constant engagement, and stops on said sash arranged to limit the movement of the shield member.

3. In combination, a wind shield having a member pivoted on a horizontal axis to provide swinging movement of its lower edge, a sash hingedly supported beneath said lower edge and having its free upper edge swinging therewith whereby to fill the bottom opening formed by swinging the shield member, and springs arranged to force the free edge portion of the sash toward the shield member.

4. In combination, a wind shield having a member pivoted on a horizontal axis to provide swinging movement of its lower edge, a sash hingedly supported beneath said lower edge and having its free upper edge swinging therewith whereby to fill the bottom opening formed by swinging the shield member, stops on said sash arranged to limit the movement of the shield member, and springs arranged to force the free edge portion of the sash toward the shield member.

5. In combination, a wind shield frame, a shield member horizontally pivoted to said frame and having its lower edge swingingly movable to the rear, a sash frame hinged horizontally beneath said frame and having its upper edge swingingly movable rearwardly and downwardly, said sash thereby closing the opening in front of the lower edge of the shield member, means to hold said shield member and sash frame normally in constant engagement, and a fine meshed screen filling said sash frame.

6. In combination, a wind shield frame, a shield member horizontally pivoted to said frame and having its lower edge swingingly movable to the rear, a sash frame hinged horizontally beneath said frame and having its upper edge swingingly movable rearwardly and downwardly, said sash thereby closing the opening in front of the lower edge of the shield member, means to hold said shield member and sash frame normally in constant engagement, a fine meshed screen filling said sash frame, and stops on said sash frame arranged to limit the rearward movement of the lower edge of the shield member.

7. In combination, a wind shield frame, a shield member horizontally pivoted to said frame and having its lower edge swingingly movable to the rear, a sash frame hinged horizontally beneath said frame and having its upper edge swingingly movable rearwardly and downwardly, said sash thereby closing the opening in front of the lower edge of the shield member, means to hold said shield member and sash frame normally in constant engagement, a fine meshed screen filling said sash frame.

8. In combination, a wind shield frame, a shield member horizontally pivoted to said frame and having its lower edge swingingly movable to the rear, a sash frame hinged horizontally beneath said frame and having its upper edge swingingly movable rearwardly and downwardly, said sash thereby closing the opening in front of the lower edge of the shield member, a fine meshed screen filling said sash frame, stops on said sash frame arranged to limit the rearward movement of the lower edge of the shield member, and springs arranged to force the free edge portion of the sash frame toward the shield member.

9. In combination, a wind shield frame, a shield member horizontally pivoted to said frame and having its lower edge swingingly movable to the rear, a sash frame hinged horizontally beneath said frame and having its upper edge swingingly movable rearwardly and downwardly, said sash thereby closing the opening in front of the lower edge of the shield member, means to hold said shield member and sash frame normally in constant engagement, a fine meshed screen filling said sash frame, stops on said sash frame arranged to limit the rearward movement of the lower edge of the shield member, said stops being further arranged to engage the rear face of the shield member when the latter is closed.

10. An attachment for wind shields consisting of a pair of hingedly connected members, one of said members being adapted to be secured to a vehicle beneath the wind shield thereof, the remaining member consisting of a sash frame supporting a screen and adapted to lie behind the lower part of said wind shield, stops on the forward face of the last mentioned member adjacent its free edge, and springs carried by said members and arranged to force the free edge of the second member forwardly.

In testimony whereof I affix my signature in the presence of two witnesses.

ARTHUR A. MacDONELL.

Witnesses:
  Mrs. Arch Carson,
  Fannie Berkintz.